United States Patent
Congdon et al.

(10) Patent No.: US 10,057,167 B2
(45) Date of Patent: Aug. 21, 2018

(54) IDENTIFYING END-STATIONS ON PRIVATE NETWORKS

(71) Applicant: Tallac Networks, Inc., Rocklin, CA (US)

(72) Inventors: Paul T Congdon, Granite Bay, CA (US); Chuck A Black, Rocklin, CA (US)

(73) Assignee: Tallac Networks, Inc., Rocklin, CA (US)

( * ) Notice: Subject to any disclaimer, the term of this patent is extended or adjusted under 35 U.S.C. 154(b) by 301 days.

(21) Appl. No.: 14/683,095

(22) Filed: Apr. 9, 2015

(65) Prior Publication Data
US 2015/0295885 A1    Oct. 15, 2015

Related U.S. Application Data

(60) Provisional application No. 61/977,588, filed on Apr. 9, 2014.

(51) Int. Cl.
*H04L 12/743* (2013.01)
*H04L 12/46* (2006.01)
*H04L 29/12* (2006.01)

(52) U.S. Cl.
CPC ...... *H04L 45/7453* (2013.01); *H04L 12/4633* (2013.01); *H04L 61/2514* (2013.01); *H04L 61/2557* (2013.01); *H04L 61/103* (2013.01); *H04L 61/2015* (2013.01); *H04L 61/2517* (2013.01)

(58) Field of Classification Search
CPC ............ H04L 45/7453; H04L 41/0806; H04L 12/4633; H04L 61/2557; H04L 61/2514; H04L 61/103; H04L 61/2517; H04L 61/2015
See application file for complete search history.

(56) References Cited

U.S. PATENT DOCUMENTS

| | | | |
|---|---|---|---|
| 2015/0089032 A1* | 3/2015 | Agarwal | H04L 41/0816 709/221 |
| 2015/0180769 A1* | 6/2015 | Wang | H04L 45/38 370/236 |
| 2016/0182510 A1* | 6/2016 | Sonoda | H04L 63/0876 726/4 |
| 2016/0315847 A1* | 10/2016 | Zhang | H04L 12/6418 |

* cited by examiner

*Primary Examiner* — Christopher Grey
(74) *Attorney, Agent, or Firm* — David T. Millers

(57) ABSTRACT

A protocol such as OpenFlow providing communication between an SDN framework controller on one network and a data plane device for another network can be used to modify or process network packets so that an external application or server can communicate with the controller and obtain information needed to uniquely associate the packets with particular end-stations even after those packets have traversed a NAT router.

13 Claims, 7 Drawing Sheets

FIG. 2 (PRIOR ART)

| Offsets | Octet | \multicolumn{8}{c}{0} | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|

IPv4 Header Format

| Offsets | Octet | 0 | | | | | | | | | | | | | | | 1 | | | | | | | | 2 | | | | | | | 3 | |
|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Version | | | | IHL | | | | DSCP | | | | | | ECN | | Total Length | | | | | | | | | | | | | | | |
| 4 | 32 | Identification | | | | | | | | | | | | | | | | Flags | | | Fragment Offset | | | | | | | | | | | | |
| 8 | 64 | Time To Live | | | | | | | | Protocol | | | | | | | | Header Checksum | | | | | | | | | | | | | | | |
| 12 | 96 | Source IP Address | | | | | | | | | | | | | | | | | | | | | | | | | | | | | | | |
| 16 | 128 | Destination IP Address | | | | | | | | | | | | | | | | | | | | | | | | | | | | | | | |
| 20 | 160 | Options (if IHL > 5) | | | | | | | | | | | | | | | | | | | | | | | | | | | | | | | |

*FIG. 2 (PRIOR ART)*

TCP Header Format

| Offsets | Octet | 0 | | | | | | | | | | | | | | | 1 | | | | | | | | 2 | | | | | | | 3 | |
|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source Port | | | | | | | | | | | | | | | | Destination Port | | | | | | | | | | | | | | | |
| 4 | 32 | Sequence Number | | | | | | | | | | | | | | | | | | | | | | | | | | | | | | | |
| 8 | 64 | Acknowledgment Number (if ACK set) | | | | | | | | | | | | | | | | | | | | | | | | | | | | | | | |
| 12 | 96 | Data Offset | | | | Rsrvd 000 | | | | NS | CWR | ECE | URG | ACK | PSH | RST | SYN | FIN | Window Size | | | | | | | | | | | | | | |
| 16 | 128 | Checksum | | | | | | | | | | | | | | | | Urgent Pointer (if URG set) | | | | | | | | | | | | | | | |
| 20 | 160 | Options (if Data Offset > 5. Padded at the end with "0" bytes if necessary.) | | | | | | | | | | | | | | | | | | | | | | | | | | | | | | | |
| ... | ... | ... | | | | | | | | | | | | | | | | | | | | | | | | | | | | | | | |

*FIG. 3A (PRIOR ART)*

UDP Header Format

| Offsets | Octet | 0 | | | | | | | | | | | | | | | 1 | | | | | | | | 2 | | | | | | | 3 | |
|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source Port | | | | | | | | | | | | | | | | Destination Port | | | | | | | | | | | | | | | |
| 4 | 32 | Length | | | | | | | | | | | | | | | | Checksum | | | | | | | | | | | | | | | |

*FIG. 3B (PRIOR ART)*

IDENTIFYING END-STATIONS ON PRIVATE NETWORKS

BACKGROUND

Public cloud applications often need to uniquely identify end-stations connected to private networks. However, standard information (such as an IP address) that may be within a network packet and might otherwise be used to identify the end-station on the private network may be lost when the packet is transferred across a private/public router performing a process such as network address translation (NAT). Accordingly, standard information in a network packet as delivered to a public cloud application may not uniquely identify a source end-station that is on a private network. Other methods for identifying end-stations on private networks are thus needed, but the identification of an end-station should not require the end-station to perform explicit actions or signaling. Otherwise, an identification process may only be operable with end-stations that are specifically modified, upgraded, or built to accommodate identification, and such identification processes may be unable to identify many existing or legacy end-stations.

SUMMARY

In accordance with an aspect of the invention, a controller using the OpenFlow protocol or a similar communication protocol in a Software-Defined Networking (SDN) framework may map or associate packets with unique parameters that can be provided to an external application so that the external application can uniquely associate packets with a particular end-station on a private network even if those packets have traversed a router that performs a process such as a NAT process. Such techniques can be used, for example, by an external application that performs end-user authentication using captive portal techniques and communicates with the controller to identify the end-station.

In some implementations, the controller assigns a unique communication parameter to a connecting end-station on a private network, and packets from the end-station may be modified to use the assigned communication parameter. A networking framework may employ several different methods of modifying packets from end-stations on a private network in order to allow external applications to uniquely identify the end-stations. For example, each packet from an end-station may be modified to contain or use an associated IP destination address, an associated source port value, or an associated IP Options value. The OpenFlow approach to Software-Defined Networking enables such modifications because an OpenFlow controller can instruct an OpenFlow device or data-path device on a private network to perform actions on the transmitted packet, before the packet traverses a NAT router. The actions taken by the OpenFlow or data-path device and communications with the controller may allow the packet to be uniquely identified after the packet has traversed the NAT router.

Some implementations may employ facilities of the OpenFlow approach to modify packets in a manner that is transparent to NAT routers and the end-stations.

An implementation may define ways to pool and re-use communication parameters that can be transferred across a NAT router, e.g., public IP addresses and/or transport protocol port numbers, for the purposes of identifying end-stations on private addressed networks when the need for identifying the end-station is transient. In one implementation, a captive portal authentication application can make use of this facility. Today, captive portal applications, particularly the components of the applications that perform the HTTP redirection, normally identify individual user sessions either by Media Access Control (MAC) address or Internet Protocol (IP) address of end-stations, and thus the captive portal application needs to reside within the private network of the end-stations. In some implementations disclosed herein, the captive portal application may reside in the public network and still provide individual session authentication of end-stations on the private network.

In some implementations, the controller calculates a hash value of unmodified or modified contents of a packet to map the packet to a unique hash value. A mapping of the hash value to the end-station can be communicated to an external application such as a captive portal application for use in identifying the end-station that sent the packet.

Some other implementations provide interfaces between an OpenFlow controller and a network application needing to obtain the unique identity of end-stations on private networks that are under OpenFlow control.

One specific implementation is a network process. The process includes receiving, at a controller on a first network, a message from a data-path device on a second network. The message encapsulates a packet that is from an end-station on the second network and that is encapsulated before the packet passes through a network address translation (NAT) device between the second network and the first network. From the encapsulated packet, the controller can determine identifying information that identifies the end-station. The controller can further map the identifying information and therefore the end-station to a packet characteristic and convey to a server seeking to distinguish end-stations that the packet characteristic maps to the end station.

Another specific implementation is also a process that includes receiving, at a controller on a first network, a message from a data-path device on a second network. The message encapsulates a packet that is from an end-station on the second network and that is encapsulated before the packet through a network address translation (NAT) device between the second network and the first network. From the message, the controller determines identifying information that identifies the end-station. A communication parameter selected from among a plurality of available communication parameters can be assigned to the end-station, and the controller can convey to a server seeking to distinguish end-stations that the communication parameter is assigned to the end station. The controller may also program the data-path device so that packets that are from the end-station and directed through the NAT router use the communication parameter assigned to the end-station.

Yet another implementation is a process that includes receiving, at a controller on a first network, a message from a data-path device on a second network. The message encapsulates a first packet that is from an end-station on the second network and is encapsulated before the packet passes through a network address translation (NAT) device that is between the second network and the first network. The controller can determine from a header of the first packet identifying information that identifies the end-station, can calculate a hash value using contents of the first packet, and can store the identifying information and the hash value. A second packet, which may or may not be identical to the first packet, can then be sent through the NAT device to a server, where the server calculates the hash value using contents of the second packet as received by the server. The server and the controller communicate the hash value and information to identify the end-station to the server.

Still another implementation is a controller for a Software Defined Networking (SDN) framework system. The controller includes an identifier module, a database, and an application interface. The identifier module determines identifying information of end-stations connected to the controller through a NAT device. The database associates the identifying information respectively with distinct parameters of packets from the end-stations, and the interface is configured to provide a external server or application with a mapping of one of the distinct parameters to the identifying information of the end-station that sent the packet associated with the distinct parameter.

BRIEF DESCRIPTION OF THE DRAWINGS

FIG. 2 shows the fields of an IPv4 packet header.

FIGS. 3A and 3B show the fields of Transmission Control Protocol (TCP) and User Datagram Protocol (UDP) headers, respectively.

The drawings illustrate examples for the purpose of explanation and are not of the invention itself. Use of the same reference symbols in different figures indicates similar or identical items.

DETAILED DESCRIPTION

Software-Defined Networking (SDN) decouples the control plane, i.e., the systems that decide where network traffic is sent, from the data plane, i.e., the systems that forward traffic to the selected destination. SDN, however, requires communications between the control plane and data plane devices. OpenFlow is a communications protocol that allows an OpenFlow controller on one network such as the Internet to communicate with the data plane of a network switch, router, or other OpenFlow device that acts as an access point for another network, e.g., a private network.

Figure 1:
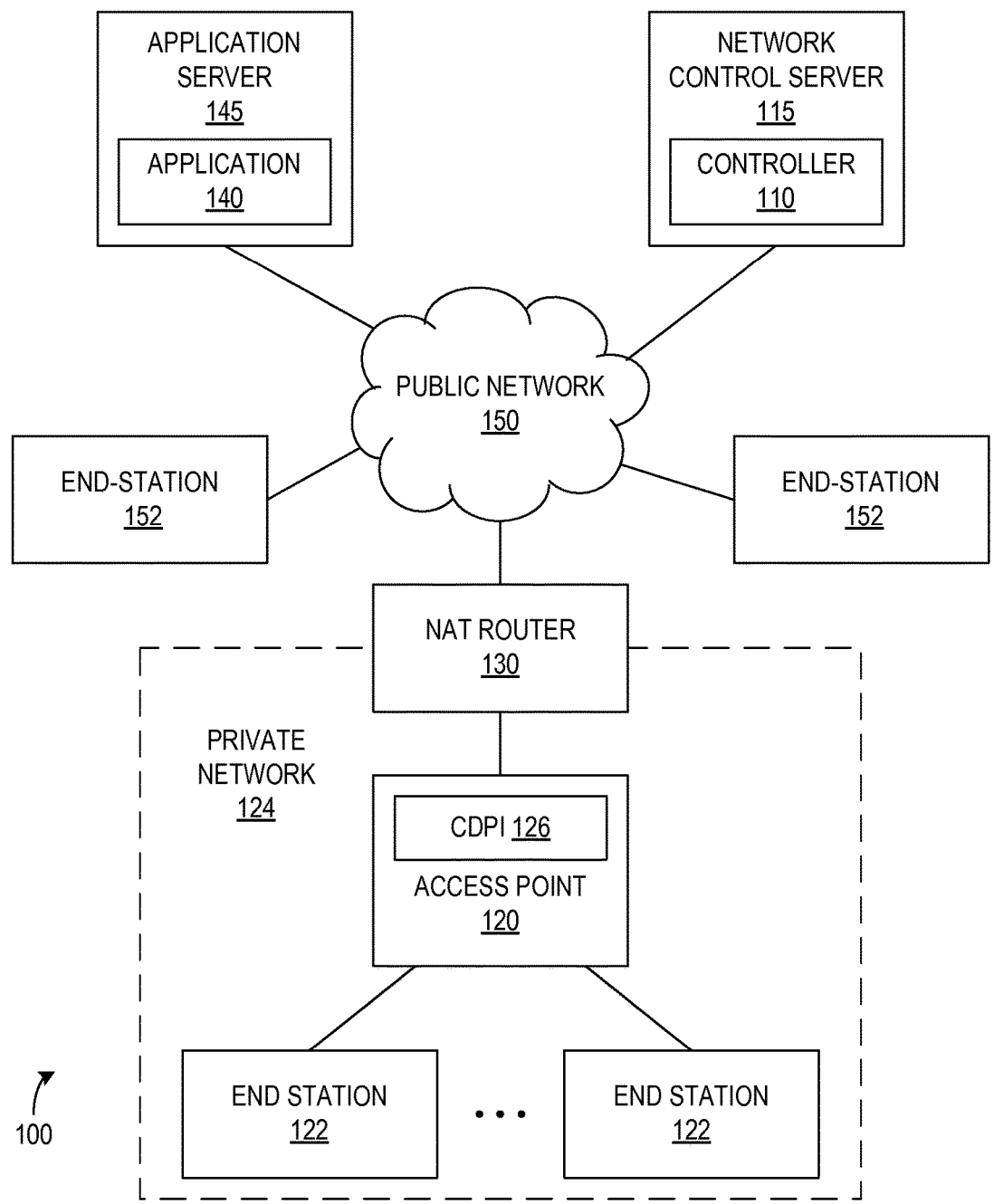
FIG. 1 shows a network environment involving a control-plane device, a data-plane device, a NAT router and end-stations on a private network.

FIG. 1 illustrates system 100 in which an application 140 on an application server 145 connected to a public network 150 may identify and distinguish end-stations 122 on a private network 124 employing a router 130 that alters identifying information in packets from end-stations 122. In particular, Network Address Translation (NAT) is a common feature in current routers that allows multiple end-stations on a private network to connect to a public network by sharing a single public address such as an Internet Protocol version 4 (IPv4) address or an Internet Protocol version 6 (IPv6) address. Private networks, such as private network 124, may use addresses within specific address ranges as defined by IETF RFC 1918 for IPv4. Similar address ranges have been defined for Internet Protocol version 6 (IPv6). In general, private IP addresses may only be guaranteed to be unique on a particular private network. Other private networks may reuse the same address ranges. On the other hand, each public IP address used across the Internet is intended to be globally unique.

IPv4 and IPv6 are well-known protocols for use on packet-switched networks. An IP packet under either protocol generally includes a header section and a data section, and one or more IP packets may form a datagram that is sent between applications running on devices such as end stations 122 and application server 145. FIG. 2 shows the fields of an IPv4 header. The fields of the IPv4 header include: a protocol version number; an Internet Header Length (IHL); a Differentiated Services Code Point (DSCP); an Explicit Congestion Notification (ECN); a Total Length field defining the entire packet (fragment) size; an Identification field primarily used to uniquely identify the group of fragments of a single IP datagram; Fragmentation Flags, a Fragment Offset field specifying an offset of a particular fragment relative to the beginning of the original unfragmented IP datagram; a Time To Live (TTL) field limiting a datagram's lifetime; a Protocol field defining the protocol used in the data portion of the IP datagram; a Header Checksum for error checking the IPv4 header; a Source IP Address; a Destination IP Address; and an Options Field. The fields of IP headers are well known in the art and are not described in detail here, but the IPv4 header is used herein as an example illustrating how known protocols can be employed in new identification processes and systems described further below.

IPv4 generally operates on a best effort delivery model and therefore neither guarantees delivery nor assures proper sequencing or avoidance of duplicate delivery. Such aspects may be addressed by an upper layer transport protocol, such as the Transmission Control Protocol (TCP). TCP is one of the core protocols of the Internet protocol suite and can provide ordered and error-checked delivery of a stream of octets between applications running on devices connected to private or public networks. FIG. 3A shows the fields of a TCP header. The TCP header includes: a Source Port field identifying the sending port; a Destination Port field identifying the receiving port; a Sequence Number indicating an initial sequence number or an accumulated sequence number depending on the SYN flag; an Acknowledgment Number that, if the ACK flag is set, indicates the next sequence number that the receiver is expecting; a Data offset specifying the size of the TCP header; reserved bits; Flags or control bits NS, CWT, ECE, URG, ACK, PSH, RST, SYN, and FIN; a Window Size field indicating the size of a receive window; a checksum; an Urgent pointer that, if the URG flag is set, indicates an offset from the sequence number indicating the last urgent data byte; and Options having up to three fields: Option-Kind (1 byte), Option-Length (1 byte), and Option-Data (variable). TCP and TCP headers are well known in the art and are not described in detail here, except as needed to illustrate how known protocols can be employed in identification processes and systems described further below.

Applications that do not require the reliability of a TCP connection may instead use the connectionless User Datagram Protocol (UDP), which emphasizes low-overhead and reduced latency rather than error checking and delivery validation. FIG. 3B shows the fields of a UDP header. The UDP header includes: a Source Port field identifying the sending port; a Destination Port field identifying the receiving port; a Length field specifying the length in bytes of the UDP header and UDP data; and a Checksum that may be used for error-checking of the UDP header and the UDP data. UDP and UDP headers are also well known in the art and are not described in detail here, except as needed to illustrate how known protocols can be employed in identification processes and systems described further below.

In normal TCP/UDP communications between two end-stations 122 that are not separated by a NAT router, the original IPv4 source and destination address fields, as well as the original TCP/UDP source and destination port fields are swapped depending upon the direction of communication. The end-station 122 originating the connection will put its IPv4 address in the IP source address field of the IP header, the remote end-station's IPv4 address in the IP destination address field and typically chooses well known TCP/UDP port numbers as the destination port field in the TCP/UDP header. The TCP/UDP source port number will typically be unique for the source port field. Slight variations of TCP/UDP port number selections will depend upon the particular protocol running on top of TCP or UDP, but nonetheless, the values of the source and destination port fields are generally swapped on packets that are returning from the remote end-station 122 to the end-station 122 originating the connection.

In order to allow multiple end-stations 122 on private network 124 to share the public IP address of NAT router 130 while communicating with external end-stations 152 over TCP/UDP protocols, NAT router 130 may modify fields within the IPv4 and TCP/UDP headers. When a packet originating from an end-station 122 on private network 124 traverses NAT router 130 towards public network 150, the NAT function replaces the private IPv4 source IP address with the public IPv4 address of router 130. When using TCP and UDP, NAT router 130 will also replace the source port field of the TCP or UDP header with a unique value in order to enable a proper mapping of packets returning from the external end-station 152. Different end-stations 122 originating connections to remote public end-stations 152 may choose the same TCP/UDP source port number, so NAT router 130 must replace this value with an ephemeral value that NAT router 130 can use to uniquely identify the returning packets. Returning packets originating from the external end-station 152 being sent to private end-stations 122 behind the NAT router will have the TCP and UDP source and destination port numbers swapped as described above. The NAT router 130 will locate the unique combination of source public IPv4 address and destination port number in the received packet to determine which private end-station 122 needs to ultimately receive the packet. The NAT router 130 will replace the destination public IPv4 address and ephemeral destination port number with the original private IPv4 address and TCP/UDP source port number used by the original private end-station 122 and forward the packet onto the private network 124. The NAT router 130 also updates checksum fields in both the IP and TCP/UDP headers to assure these modifications go unnoticed by the end-station 122 involved in the conversation.

It is important to note that a standard NAT device will not modify the destination IP address or destination port number on packets originating from private end-stations 122. Similarly, a standard NAT device will not modify source IP addresses or source TCP/UDP port numbers on packets originating from public end-stations 152. In addition, unknown values passed in the IP options field that may be placed in the packet by public end-stations 152 may or may not traverse the NAT unmodified. Since there is no standard specifying what to do with unknown values in the IP options field, unpredictable behavior may be expected. For example, some NAT routers may strip the options. Many NAT routers allow the options to traverse the NAT router unmodified. TCP/UDP packet payload is also not modified by a NAT router in either direction. More details about how NAT traversal works can be found in IETF Request for Comment Documents (RFC) documents such as IETF RFC 2663, IETF RFC 2993, and IETF RFC 3022, which are hereby incorporated by reference in their entirety.

Software-defined networking (SDN) decouples the system that makes decisions about where network traffic is sent (the control plane) from the underlying systems that forward traffic to the selected destination (the data plane). System 100 of FIG. 1 shows an implementation of SDN including a Network Control Server 115 connected to public network 150 and executing SDN controller 110 that makes decisions about where traffic is sent, and an access point 120 that provides a data path for traffic as directed by SDN controller 110. In an exemplary implementation disclosed herein, the SDN controller 110 executed on network control server 115 is an OpenFlow controller, and access point 120 is an OpenFlow device. OpenFlow controllers such as the exemplary embodiment of controller 110 typically control many OpenFlow devices such as the exemplary embodiment of access point 120. An OpenFlow device typically has a single controller, but it may also be associated with alternate or back-up controllers. Accordingly, OpenFlow controllers and OpenFlow devices are not necessarily in a one-to-one relationship. The OpenFlow protocol and specification are part of an overall SDN architecture and is defined by the Open Networking Foundation. The OpenFlow protocol provides facilities to externally program the forwarding plane of a network switch or router, e.g., access point 120, from a centralized controller, e.g., network control server 115. FIG. 1 shows NAT router 130 and OpenFlow device 120 as separate, but NAT router 130 and OpenFlow device 120 may be implemented as a single device. Network control server 115 is shown as a single device that is separate from other devices such as application server 145, but network control server 115 may include multiple devices such as multiple servers that collectively implement controller 110 as an SDN controller or more particularly an OpenFlow controller, and the device or devices constituting network control server 115 may serve other purposes, for example, to act as one or more end-stations 152 or application server 145.

The following describes and an example implementation in which controller 110 is an OpenFlow controller. OpenFlow provides a protocol that allows controller 110 to program operation of access point 120 and thereby control data paths that access point 120 provides. Access point 120 may include a wired or wireless transceiver (not shown) capable of communicating with end stations 122 using a communication protocol such as Ethernet or WiFi protocols, e.g., IEEE Std 802.3 or IEEE Std 802.11, and may further include Control to Data-Plane Interface (CDPI) agent 126 capable of processing OpenFlow instructions from controller 110. In other implementations, controller 110 may be an SDN controller using a protocol other than the OpenFlow protocol to control data plane aspects of access point 120.

In the OpenFlow implementation, controller 110 may use the OpenFlow protocol to program flow entries into flow tables of OpenFlow device 120. A flow entry is an n-tuple of match fields that device 120 compares to actual packet fields contained in packets that device 120 receives. The match fields include protocol header fields such as IPv4 source and destination addresses, TCP/UDP port numbers, and other packet values such a MAC addresses, ethertypes, etc. The flow entry programmed by the controller 110 may include wildcard fields in the n-tuple. Flow entries may have a priority order, and searching the flow table proceeds through entries according to priority and stops upon finding the first matching entry/rule. OpenFlow Specification v1.5, which is hereby incorporated by reference in its entirety, further describes details of flow entries. Associated with a flow entry is a set of instructions that are to be executed if the received packet matches the match fields of the entry. Executing the instructions may result in changes to the received packet, the set of follow-on actions, and how the packet itself will be forwarded through the OpenFlow device table pipeline. The result of flow entry matches and executed instructions create an action set that determines exactly what modifications are to be made and how and where the packet received at access point 120 will be forwarded. An example action in the action set is the set-field action where values in the packet headers can be modified or set (e.g., to replace the destination IPv4 address). Typically, the packet will be forwarded to a particular output port on OpenFlow device 120. However, a possible destination specified in the action set may be OpenFlow controller 110. When the packet is sent to OpenFlow controller 110, the packet is encapsulated in an OpenFlow protocol Packet-In message. OpenFlow controller 110 may send a packet back to OpenFlow device 120 using a Packet-Out message which includes an action set as well (specified by OpenFlow controller 110). In one implementation, OpenFlow controller 110 may receive a packet from OpenFlow device 120 via an OpenFlow Packet-In message, make modifications to the packet that will be preserved when the packet ultimately traverses NAT router 130, and return the packet to OpenFlow device 120 using a Packet-Out message that includes additional instructions on how and where to forward the packet. The packet returned in the Packet-Out message to access point 120 is unencapsulated and may then traverse NAT router 130.

OpenFlow controller 110 may also contain an application programming interface (API) that allows external applications to exploit the capabilities of controller 110 and the OpenFlow protocol. These external applications, which may reside in a server connected to OpenFlow controller 110 through a public network 150, e.g., public application 140 in server 145, may receive information about received packets from OpenFlow controller 110, or the external applications may instruct the OpenFlow controller 110 to take specific actions. In one implementation, controller 110 informs an external application about information that the external application can use to uniquely identify privately addressed end-stations 122 on the opposite side of NAT router 130 from the external application, and the external application may inform the OpenFlow controller 110 of status changes within the application itself. For example, OpenFlow controller 110 may need to know when the external application is done using the resources required for the identification process, so that OpenFlow controller 110 may re-use the resources on a subsequent transaction, and the external application may inform OpenFlow controller 110 of such status changes.

Figure 4A:
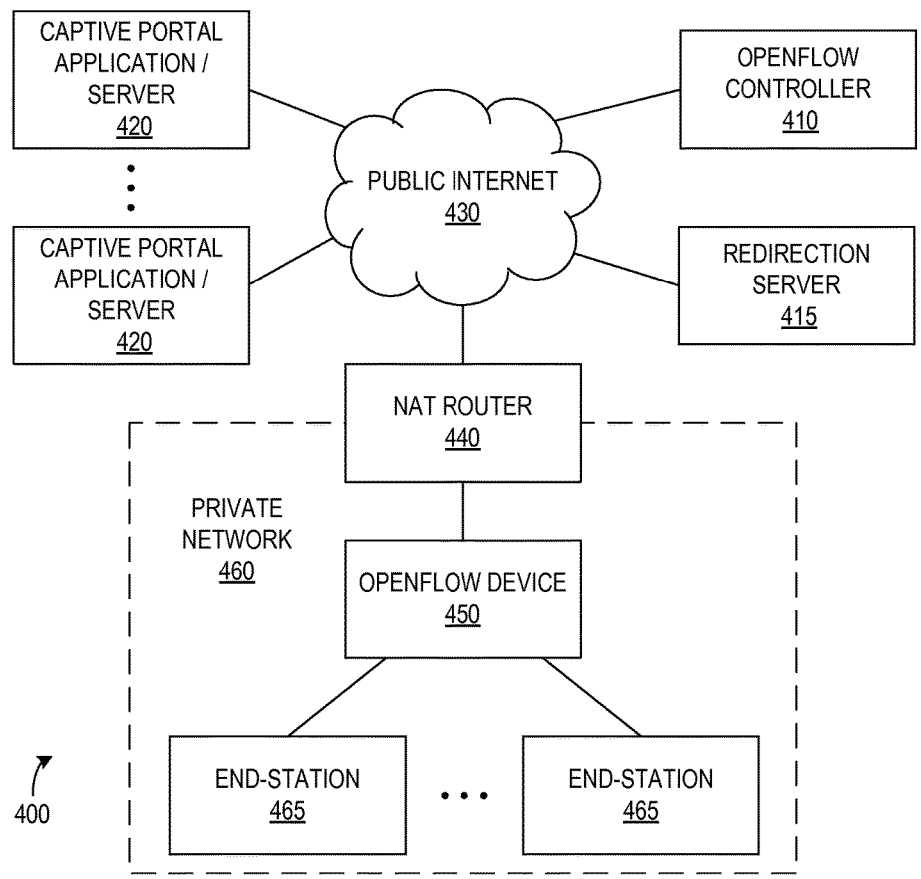
FIG. 4A depicts an example network environment with a captive portal application on a public network.

One example of such an application is a captive portal. FIG. 4A illustrates one implementation of a captive portal system 400. Captive portal system 400 includes a private network 460 in which end-stations 465 connect to an OpenFlow switch or device 450 that acts as an access point in private network 460. OpenFlow device 450 connects to a network 430 such as the Internet through a router 440 implementing network address translation. An OpenFlow controller 410, a redirection server 415, and one or more captive portal applications 420 are implemented on one or more servers or other computing devices connected to public network 430.

A captive portal application 420 may be used to authenticate a user of an end-station 465, before allowing the authenticated end-station 465 access to network 430, e.g., to the Internet. Captive portal applications are commonly used in WiFi HotSpots such as provided by hotels or other businesses, but captive portal applications are also seen frequently in enterprise networks to provide a guest with access to the enterprise network. An environment using captive portal authentication typically blocks all network traffic with an end-station except that which is necessary to allow the end-station to obtain an address and attempt an HTTP request, e.g., via a web browser executed on an end-station 465. The captive portal environment initially forces the redirection of the HTTP request to a specific web page, usually for the purposes of authentication, payment, or to display information. Once the exchange between an end-station 465 and the specific web page has succeeded, the captive portal server/application 420 may unblock access to the Internet or other network 430 for the particular end-station 465. OpenFlow device 450 may redirect the initial HTTP request by replacing the destination IP address of the web server that the end-station 465 desires with the IP address of the specific redirection web server 415. Then, the end-station 465 'thinks' it is establishing an HTTP session with the desired web server, but in reality, the end-station 465 is establishing a connection to redirection server 415. Redirection server 415 may respond to the initial HTTP request with an HTTP status code, e.g., status code "302," "305," or "307," which instructs the end-station 465 to issue another HTTP request to a new web server, such as the web server hosting the captive portal 420 providing specific web pages with, for example, information, authentication, or payment instructions. The transaction between the end-station 465 and captive portal server/application 420 must complete before the end-station 465 is allowed unblocked access to the Internet or other network 430.

FIG. 4A depicts an example captive portal environment 400 including multiple servers/applications 410, 415, and 420 with IP addresses on network 430, which may be a public network such as the Internet. In FIG. 4A, server 410 includes a network control application and may act as a network controller 410 according to the OpenFlow protocol. Accordingly, network controller 410 is sometimes referred to herein as OpenFlow controller 410. Redirection server 415 may communicate with network controller 410 during redirection processes as described further below. System 400 also includes one or more independent captive portal servers 420 that are responsible for interacting with end-stations 465, for example, to obtain usernames and passwords for authentication of a user or an end-station 465. The captive portal environment 400 is used here as a detailed example, however other applications and environments can benefit from described techniques for identifying end-stations. Further, environment 400 illustrates just one possible implementation of a captive portal environment, and wide variations in the environment are possible. For example, the functions of servers 410, 415, and 420 do not need to be implemented in separate physical devices. In particular, redirection server 415 may be implemented in the same physical device as network controller 410 or the same physical device as a captive portal server 420. Further, each server 410, 415, or 420 may be implemented using multiple servers or other computing devices.

NAT router 440 is at the edge or boundary between a private network 460 and public network 430. NAT router 440 has two interfaces, one with a public IP address, e.g., 76.14.102.124, and another supporting the private address space of private network 460, e.g., 192.168.1.X. Attached to the NAT router 440 is a data-forwarding device 450 that may include an Ethernet switch, an IEEE 802.11 Wireless Access Point, or similar device capable of receiving and forwarding data. Data forwarding device 450 is also capable of being programmed according to the SDN protocol that network controller 410 uses. In particular, data-forwarding device 450 in an exemplary embodiment supports the OpenFlow protocol and may establish a connection to controller 410 across NAT router 440. Accordingly, data-forwarding device 450 is sometimes referred to herein as OpenFlow device 450. In some implementation, NAT router 440 and data-forwarding device 450 may be combined into a single device.

Data-forwarding device 450 communicates with or forwards data for one or more privately addressed end-stations 465 on private network 460. Each end-station 465 has a private IP address, e.g., 192.168.1.10 or 192.168.1.11, that is unique on private network 460.

Redirection server 415 is on the public side of NAT router 440 but for a captive portal application, redirection server 415 may need to identify or distinguish individual sessions of end-stations 465 that are on the private side of NAT router 440. Redirection server 415 may use the identity information, for example, in selecting a captive portal server 420 to which the end-station 465 is directed and to ensure the selected captive portal server 420 is informed on the identity of the end-station 465. Because NAT router 440 translates all of the internal private IP addresses to the public IP address of network 460, e.g., 76.14.102.124, redirection server 415 conventionally cannot distinguish among end-stations 465 on private network 460 using packets from NAT router 440. In accordance with an aspect of the present invention, interactions between controller 410 and data-forwarding device 450 can facilitate packet modifications and enable redirection server 415 or controller 410 to uniquely identify or distinguish end-stations 465.

Figure 4B:
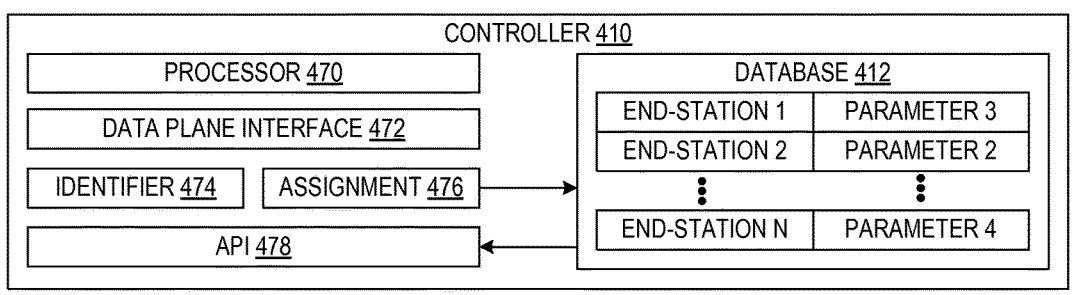
FIG. 4B is a block diagram of a control-plane device such as an OpenFlow controller in accordance with one implementation of the environment shown in FIG. 4A.

FIG. 4B illustrates one specific implementation of controller 410 that allows identification of end-stations on a private network 460. Controller 470 includes a processor 470 such as a microprocessor or a microcontroller, a database 412 including data in a storage device, and a set of modules that as illustrated includes a data plane interface 472, an identifier module 474, an assignment module 476, and an Application Program Interface (API) 478. Each of modules 472, 474, 476, and 478 may include, for example, hardware devices including electronic circuitry for implementing the functionality described herein. In addition or as an alternative, each module 472, 474, 476, and 478 may be partly or fully implemented by processor 470 executing instructions encoded on a machine-readable storage medium. Data plane interface 472 may be a Control to Data-Plane Interface (CDPI) driver and in one implementation is compliant with a protocol such as the OpenFlow protocol for communications with a data-forwarding device 450. Identifier module 474 may serve to identify an end-station 465 based on communications with data forwarding device 450, and assignment module 476 can assign a parameter to the identified end-station as described further below and can record such assignments in database 412. API 478 allows controller 410 to communicate with public servers such as redirection server 415 so that public servers can identify packets from any end-station 465 on private network 460.

Several methods for identifying or distinguishing end-stations on a private network are described below. Each identification process may begin by initializing or setting up an environment such as environment 400 of FIG. 4A, and one specific initialization process is described here and may be used in several identification processes described below. The specific set of rules required to set-up an environment will generally differ from application to application, and again the captive portal case is used as an example.

Captive Portal Set-Up

When a new end-station 465 attaches to private network 460, the end-station 465 generally needs to perform certain protocols in order to reach a state that permits making a first HTTP request. In particular, if the connecting end-station 465 does not already have an IP address, i.e., is not statically configured, the end-station 465 may need to request an IP address using the Dynamic Host Configuration Protocol (DHCP). In addition, the end-station 465 may need to resolve MAC addresses from IP addresses using the Address Resolution Protocol (ARP) protocol, and the end-station 465 may need to resolve IP addresses using the Domain Name System (DNS) protocol. Such protocols for connecting to and communicating through a network are well known. For example, ARP was defined by Internet Engineering Task Force (IETF) Request for Comment (RFC) 826, and DNS is defined by IETF RFC 1034 and IETF RFC 1035.

As described further herein, controller 410 can learn the private IP address of an end-station 465 on private network 460 and program data-forwarding device 450 so that redirection server 415 can identify packets corresponding to particular end-stations 465. This may be accomplished by forcing data-forwarding device 450 to intercept DHCP replies and send the intercepted DHCP replies to controller 410. If an end-station 465 may have a statically configured private IP address on network 460, data-forwarding device 450 should intercept and forward to controller 410 any packets received from any unknown IP address attempting to initiate an HTTP session. When statically configured IP addresses are allowed in the solution, there is no need to intercept DHCP messages because the general rule to capture unknown IP addresses will also apply.

Table 1 shows general and persistent "OpenFlow rules," to be evaluated in priority order, that can be installed in OpenFlow device 450 to allow ARP, DNS and DHCP protocols to operate as needed and to assure controller 410 can learn the IP addresses of end-stations 465. The OpenFlow rules shown herein use a simplified, non-specific syntax for illustrative purposes. As noted above, the OpenFlow rules have a priority order, and once a search proceeding in priority order finds a rule that matches a packet, the search stops and executes the action associated with that rule, and no more rules/actions are searched or executed. The match portion of each rule shown in the tables specifies one or more fields in the packet header (e.g., ARP is true when the Ethertype field of the Ethernet header is 0x800). Other packet fields not listed in a rule are not relevant to the match.

TABLE 1

| Priority | Rule |
|---|---|
| 1 | Match = ARP Ethertype; Action=Forward Normal |
| 2 | Match = DNS Dest Port; Action=Forward Normal |
| 3 | Match = DHCP Dest Port; Action=Forward Normal |
| 4 | Match = HTTP Dest Port; Action=Forward to Controller |
| 5 | Match = any; Action=Drop |

Once an end-station 465 has been authorized to operate on public network 430, controller 410 may program forwarding device 450 with additional rules having priority between rules 3 and 4 of Table 1. The added rules can explicitly allow the authorized end-station 465 to communicate with specified or unlimited stations on network 430, e.g., on the Internet. Rules 4 and 5 will only match if the IP address or MAC address of the end-station 465 is not known to data-forwarding device 450. For example, device 450 may have no record of receiving packets from an end-station 465 before a current packet, or the IP address does not exist in the forwarding tables of device 450.

Rules 1 to 3 of Table 1 allow the connecting end-station 465 to achieve a state where the end-station 465 can perform an initial HTTP request. Rule 4 assures that when an end-station 465 makes an initial HTTP request, device 450 intercepts the packet and sends the packet to the controller 410 encapsulated, for example, within an OpenFlow Packet-In message. The address translations or other actions of NAT router 440 do not alter the encapsulated packet. Accordingly, controller 410 can parse the original packet and obtain information identifying the end-station 465. Controller 410 may then take different specific actions for different specific implementations such as further described below.

Figure 5:
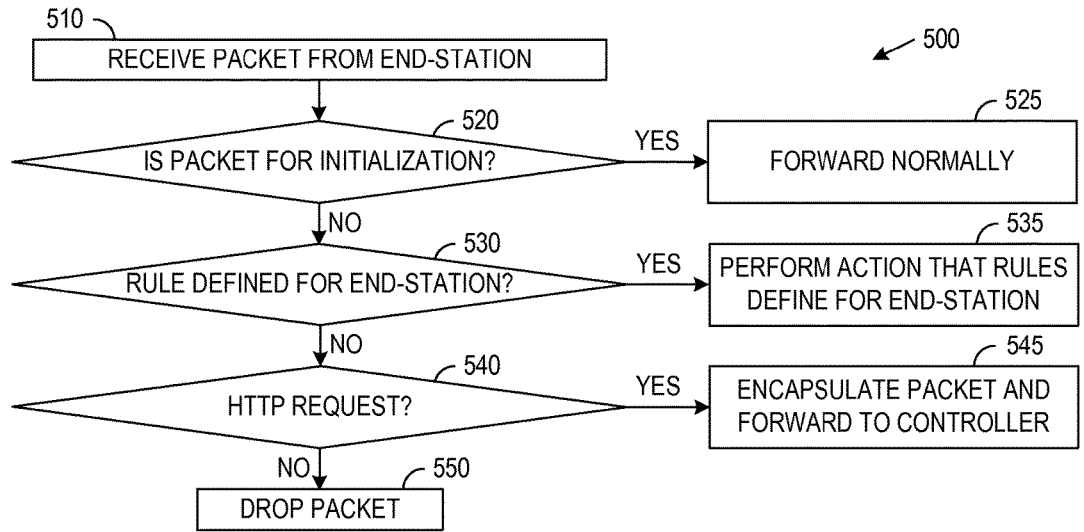
FIG. 5 is a flow diagram of a process that allows a data-plane device such as an OpenFlow device to send a control-plane device such as an OpenFlow controller a message encapsulating an initial HTTP packet from a connecting end-station.

FIG. 5 shows a flow diagram of a process 500 illustrating operation of a data-path device such as OpenFlow device 450. Process 500 complies with rules 1 to 5 of Table 1 and sends an encapsulated HTTP packet to OpenFlow controller 410. In particular, in a process block 510, OpenFlow device 450 receives a packet from an end-station 465. In decision block 520, OpenFlow device 450 determines whether the packet is for initializing or enabling the end station 465 for communication, e.g., to make an HTTP request. For example, ARP, DHCP and DNS processes may be required to enable an end-station for any TCP/IP communication process, including HTTP requests, and decision block 520 determines whether a packet is necessary for an initialization or enabling process. If so, the OpenFlow device 450 forwards the packet normally as required by rules 1, 2, and 3 of Table 1. If the packet is not for enabling the end-station 465 to make an HTTP request, decision block 530 determines whether a rule has been defined for the end-station 465 sending the packet, e.g., if a rule with priority between rules 3 and 4 exists for the end-station sending the packet. If so, the OpenFlow device 450 in process block 535 performs the action that the rules for the end-station define. If not, OpenFlow device 450 performs decision step 540 to determine whether the packet is an HTTP request. If the packet is an HTTP request from an end-station 465 for which a specific rule has not been created, OpenFlow device 450 encapsulates the packet and sends the encapsulated packet through NAT router 440 to OpenFlow controller 410. OpenFlow device 450 drops all other packets as in process block 550.

Figure 6:
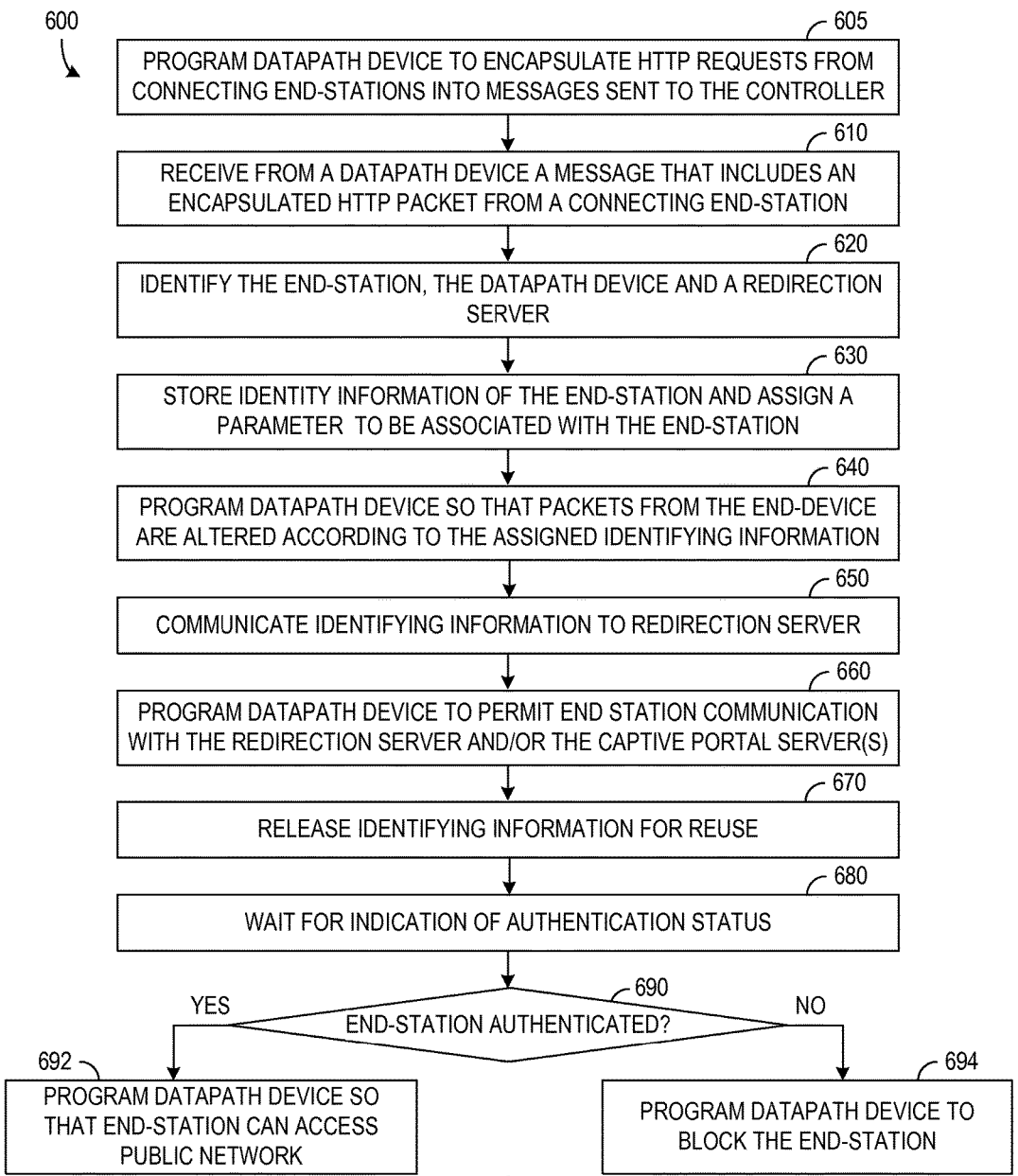
FIG. 6 is a flow diagram of a process that allows a control-plane device such as an OpenFlow controller to identify an end-station from an encapsulated HTTP packet and to program a data-plane device such as an OpenFlow device so that future communications from the end-station can be distinguished after passing through a NAT router.

FIG. 6 shows a flow diagram illustrating a process 600 for operation of a controller such as OpenFlow controller 410 of FIGS. 4A and 4B. Process 600 optionally includes initialization process 605 that initializes the data-path device, e.g., OpenFlow 450, by programming the data-path device to encapsulate HTTP requests from unrecognized or connecting end-stations and send the encapsulated requests to the controller, e.g., using an OpenFlow Packet-In messages. In some case, OpenFlow controller 450 may power up in an initialized state, e.g., programmed as indicated in Table 1, so that OpenFlow controller 410 does not need to execute initialization process 605.

In process block 610, OpenFlow controller 410 receives an encapsulated HTTP packet. In particular, with the programming of Table 1, OpenFlow device 450 may allow an end-station 465 to proceed with initialization for communication on the private network 460, but OpenFlow device 450 encapsulates any HTTP packets that might otherwise be routed outside of the private network and sends the encapsulated packet to OpenFlow controller 410 regardless of the destination IP address that end-station 465 intended. The encapsulated HTTP packet contains all of the identifying information and fields used in the private network 460, e.g., the IP source address, which permits OpenFlow controller 410 to identify a connecting end-station 465 as in process block 620. OpenFlow controller 410 in process block 630 can store identifying information for the end-station 465 in a table or database. For example, in database 412 of FIG. 4B, each of fields End-Station 1 to End-Station N may contain identifying information such as an IP source address that controller 410 extracted from an encapsulated packet from a corresponding end-station 465, and each of fields End-Station 1 to End-Station N has an associated parameter field that controller 410 may assign. In process block 640, OpenFlow controller 410 can program the OpenFlow device 450 so that further communications from that end-station 465 uses the assigned parameter and can be distinguished after passing through a NAT router 450. As described further below, OpenFlow controller 410 can use several different strategies for assigning parameters and programming of OpenFlow device 450, and the identifying information that process block 630 stores may depend on the needs of a device such as redirection server 415 and the strategy used to distinguish the packets of end-stations 465 on the private network 460.

In a process block 650 of FIG. 6, OpenFlow controller 410 communicates with redirection server 415 and then in process block 660 programs OpenFlow device 450 to enable the end-station 465 to communicate only with redirection server 415 or one or more captive portal servers 420 that redirection server 415 may identify. Accordingly, the connecting end-station 465 then has limited or restricted access to only the addresses on public network 430 used for redirection and authentication. Using the information from controller 410, redirection server 415 can identify the end-station 465 that sent a packet and redirect the end-station 465 to communicate with one or more captive portal servers 420. The URL that redirection server 415 uses in the redirection to a captive portal server 420 may include information that the captive portal server 420 uses to identify the end-station 465. The captive portal server 420 can then conduct an authentication session with the end-station 465. In the meantime, Open Flow controller 410 in process block 670 may release resources associated with the parameter assigned for identification of the end-station 465. Alternatively, the resources that OpenFlow controller 410 assigned for identification of an end-station 465 may be released after an authentication process succeeds or fails. OpenFlow controller 410 waits (process block 680) to be informed regarding or to determine whether the connecting end-station 465 is successfully authenticated. If OpenFlow controller 410 determines in block 690 that an end-station 465 has been authenticated, OpenFlow controller 410 in process block 692 programs OpenFlow device 450 to permit that end-station 465 to have broader or unrestricted access public network 430. Otherwise, OpenFlow controller 410 by performing a process block 694 may block the end station 465 from accessing public network 430. For example, the rules concerning the end-station 465 may be deleted so that the end-station may try again to authenticate and connect, or OpenFlow device 465 may be programmed to drop packets from the end-station 465.

Destination Address Assignment

In the Captive Portal example, after analysis of OpenFlow controller 410, e.g., as in block 620 of FIG. 6, identifies the end-station 465, the destination address of the HTTP request sent by the private addressed end-station 465 may need to be modified in order to direct the packet to the address of the redirection server system 415 instead of the IP address of the web page that the end-station 465 originally desired. In this strategy, redirection server 415 has multiple IP addresses, and the OpenFlow controller 410 can assign to the connecting end-station 465 one of the addresses that are currently not being used by any other end-stations 465 performing the same action. For example, in the embodiment of controller 410 of FIG. 4B, the parameter fields of database 415, which associated with different connecting end-stations 465, may contain different IP addresses of redirection server 415. With this strategy for modifying packets, the OpenFlow controller 410 maintains a pool of IP addresses for the redirection server 415 and assigns a different one of the IP addresses to each end-station 465 that currently requires redirection. In essence, with this strategy, the redirection server 415 supports and can be reached using multiple IP addresses. Since redirecting the end-station 465 to the captive portal application is ephemeral in nature, an address used for one redirection event can be made available for another redirection event once current redirection has completed. When OpenFlow controller 410 receives an encapsulated HTTP packet, OpenFlow controller 410 may select an available IP address of the redirection server 415 from the available pool, modify the destination IP address in the HTTP packet, and then return the packet to the OpenFlow device 450 using a Packet-Out message. Device 450 may forward the packet towards the redirection server 415 using the modified destination IP address. The specific actions that the OpenFlow controller 410 takes to cause the original packet to be modified may depend on the capabilities of the OpenFlow device 450.

The intercepted/encapsulated HTTP packet from the end-station 465 provides the OpenFlow controller 410 with the MAC address and IP address of the end-station on the private network 460. The HTTP packet also provides the OpenFlow controller 410 with the IP address of the desired web server that the end-station 465 is attempting to reach. After selecting an available destination IP address of redirection server 415 for the connecting end-station 465, OpenFlow controller 410 may remember a temporary binding between these elements (the MAC and IP addresses of end-station 465 and the IP address of the desired web server) in local database 412. OpenFlow controller 410 can program OpenFlow device 450 with additional rules that allow the end-station 465 to communicate with the new destination IP address for the redirection server 415. The additional rules can make the change in the destination IP address transparent to end-station 465 (i.e., end-station 465 will 'think' it is communicating with the original desired web server). Since the redirection server 415 is on the public side of NAT router 440, NAT router 440 forces all HTTP packets from end-station 465 to use the source IP address of the interface on the public side of the NAT router 440, but NAT router 440 does not change the destination address.

The rules for establishing communication with the redirection server 415 depend upon the capabilities of OpenFlow device 450. If OpenFlow device 450 supports the set-field action on MAC and IP address fields, device 450 is capable of replacing the MAC and IP addresses of a packet automatically. In this case, the OpenFlow controller 410 can set-up appropriate rules and then step out of the way while the redirection server 415 and end-station 465 establish the HTTP session and the OpenFlow device 450 automatically makes the necessary address substitution changes. If OpenFlow device 450 does not support the required set-field operation, OpenFlow controller 410 can make all of the necessary modifications to each packet before returning the packet to the OpenFlow device 450 via a Packet-out message. In this case, OpenFlow controller 410 remains in the middle of all exchanges between redirection server 415 and end-station 465 in order to continue to properly swap addresses as packets flow back and forth. For example, each packet from any end-station 465 that has not been authenticated may be encapsulated and sent to controller 410, modified by controller 410, and returned to device 450 to be sent to the modified destination IP address. Alternatively, controller 410 may only receive a first encapsulated packet from the connecting device 465 and thereafter programs device 450 to modify subsequent packets for redirection or authentication. The rules for these two cases are discussed further below.

If the OpenFlow device 450 supports the set-field action, open flow controller 410 can program on the OpenFlow device 450 the rules shown in Table 2 after the initial HTTP packet has been intercepted. These rules in Table 2 have a priority between rules 3 and 4 listed in Table 1. More specifically, the rules in Table 2 are merged into the existing Table 1 rules and will specify the following match and actions:

TABLE 2

| Priority | |
|---|---|
| 3.1 | Outgoing Packet Match=<Source MAC>, <Source IP>,<Web Dest IP>,HTTP Dest Port; Action=Set-Field(NAT Dest MAC), Set-Field(Redir Dest IP), Forward Normal |
| 3.2 | Incoming Packet Match=<Dest MAC>,<Dest IP>, <Redir Source IP>,HTTP Source Port; Action=Set-Field(Web Source IP), Forward Normal |

Rules 3.1 and 3.2 of Table 2 will only match on packets to and from the end-station during redirection. Rule 3.1 will match packets that the end-station sought to send to the original web-server destination. If the rule matches, the OpenFlow Device 450 will replace the destination IP address with that of the redirect server, and also the destination MAC address with that of the private side of the NAT router. Alternatively, OpenFlow controller 410 may perform the same operation by hand before returning the modified packet in a Packet_out message. Rule 3.2 matches packets from the redirection server that are sent to the end-station. Here, the goal is for the end-station to interpret the packet as actually coming from the original Web-Server that the end-station intended. So, if rule 3.2 matches, the action is to replace the redirection server source IP address with that of the original Web Server. The MAC address doesn't need to change to get the packet back to the correct end-station, and the NAT private MAC address can be left on the packet.

The rules typically are designed to come in pairs, to match packets in both directions (i.e., to and from the authenticating end-station 465) so that the end-station 465 does not detect that the redirection server 415 has replaced the originally desired web page. After programming these rules, OpenFlow controller 410 may return the packet to the OpenFlow device 450 in an OpenFlow Packet-Out message, where the packet may be subject to rule 3.1 of Table 2 for outgoing packets. When OpenFlow Device 450 receives a packet having as its source IP address the IP address of redirection server 410 that was assigned to a particular end-station 465, the packet is subject to rule 3.2 of Table 2 for incoming packets, and device 450 changes source IP address to the IP address that the end-station 465 was trying to access and forwards the packet to the end-station 465. It may be noted that, in Rule 3.2 of Table 2, the packet must be an HTTP packet and also match the destination MAC and IP address of the end-station. The match portion of the rule requires four matches; destination MAC, destination IP, source IP and the source port number must be that of an HTTP packet.

If the OpenFlow device 450 does not support the set-field action, OpenFlow controller 410 may interject itself in all HTTP communications between redirection server 415 and end-station 465 in order to make the necessary packet modifications on the IP addresses. The rules that allow the OpenFlow controller 410 to stay in the middle of the conversation are shown in Table 3. Note that the 'match' portion of the rules in Table 3 are the same as those in Table 2, but the action is different, i.e., with the process of Table 3 the action is forward to controller, instead of modify the packet and forward normal as in Table 2. With the process of Table 3, the controller receives all of the HTTP packets for the initial connection to the original Web server (which are redirected to the redirect server). The controller 410 can perform the packet modifications and return the modified packet to device 450 in a Packet_out message.

TABLE 3

| Priority | Rule |
| --- | --- |
| 3.1 | Outgoing packet Match=<Source MAC>, <Source IP>,<Web Dest IP>,HTTP Dest Port; Action=Forward to Controller |
| 3.2 | Incoming packet Match=<Dest MAC>, <Dest IP>,<Redir Source IP>,HTTP Source Port; Action=Forward to Controller |

With the rules of Table 2 or Table 3 in place, redirection server 415 receives an HTTP request from the privately addressed end-station 465. Redirection server 415 can communicate with the OpenFlow controller 410 to exchange information about the private end-station 465 and the actual captive portal web page to which end-station 465 will be redirected. The OpenFlow controller 410 may need to resolve the IP address of the final captive portal web page in order to properly reprogram device 450 with rules to allow the authentication exchange with captive portal servers 420 to occur and upon successful authentication, to allow the end-station 465 access to public network 430. In the simplest case, the complete authentication event will take place on a single captive portal web server 420. However, some captive portal solutions may provide more complex end-user experiences, and these may involve multiple exchanges between the end-station 465 and to multiple web and content servers 420 on public network 430. OpenFlow controller 410 needs to know all of the IP addresses of all possible servers 420 involved during the Captive Portal authentication experience in order to program device 450 with the appropriate rules. For example, OpenFlow controller 410 may communicate with redirection server 415 or one or more of captive portal servers 420 to obtain IP addresses on public network 430 that the end-station 465 is permitted to access, and OpenFlow controller 410 can program OpenFlow device 450 to forward packets only to approved IP addresses. While the authentication process may be complex, the following assumes the simple case that only requires a single Captive Portal web server 420 for authentication, and OpenFlow controller 410 can obtain the explicit IP address for that server 420 from redirection server 415.

After the redirection server 415 has communicated with the OpenFlow controller 410 regarding the initial HTTP request and provided the IP address of the captive portal web server 420, OpenFlow controller 410 can program rules on OpenFlow device 450 that allows communication with the identified captive portal web server 420. These rules, one for matching packets in each direction, may have the form shown in Table 4 and may have a priority higher than the priority of rule 3.1 in Table 2 or 3.

TABLE 4

| Priority | Rule |
| --- | --- |
| 3.01 | Match=<Source MAC>,<Source IP>, <Portal Dest IP>,HTTP Dest Port; Action=Forward Normal |
| 3.02 | Match=<Dest MAC>,<Portal Source IP>, <Dest IP>,HTTP Source Port; Action=Forward Normal |

With rules 3.01 and 3.02 of Table 4 in place at a higher priority than rules 3.1 and 3.2 of Table 3, the redirection server 415 can now send an HTTP redirect to the end-station 465 with a suitable status code, e.g., status code "302," and a new uniform resource locator (URL) for the end-station 465 to follow. In the simple case, the URL that may include the IP address of the captive portal web server 420 and potentially other identifiers that are commonly used in captive portal applications (e.g., device identifiers, station identifiers, etc.) and that the captive portal server 420 can use to identify the end-station 465. The device or station identifiers are important bits of identification that OpenFlow Controller 410 allows redirection server 415 to obtain. In the captive portal application, for example, the redirection server 415 needs to get the end-station's identity and to put the station's identity in the URL as parameters so the captive portal server 420 can present the proper authentication page(s) and create the desired end-user experience for the end-station 465. Rules 3.01 and 3.02 allow the end-station 465 to then successfully initiate an HTTP session with the captive portal web server 420. The captive portal web server 420 can interact with the connecting end-station 465 to carry out the authentication procedure and inform the OpenFlow controller 410 when the process is complete, e.g., as in process block 670 of FIG. 6.

It may be noted that the exchange with a captive portal server might be more complex in some captive portal applications, so in some cases, the match conditions set forth in Table 4 may be modified. For example, the match portion of the rules 3.01 and 3.02 may not even require an HTTP component and might just check that the source and destination IP addresses as well as the end-station MAC address, which would allow protocols other than HTTP to be used as part of the authentication process.

Figure 7:
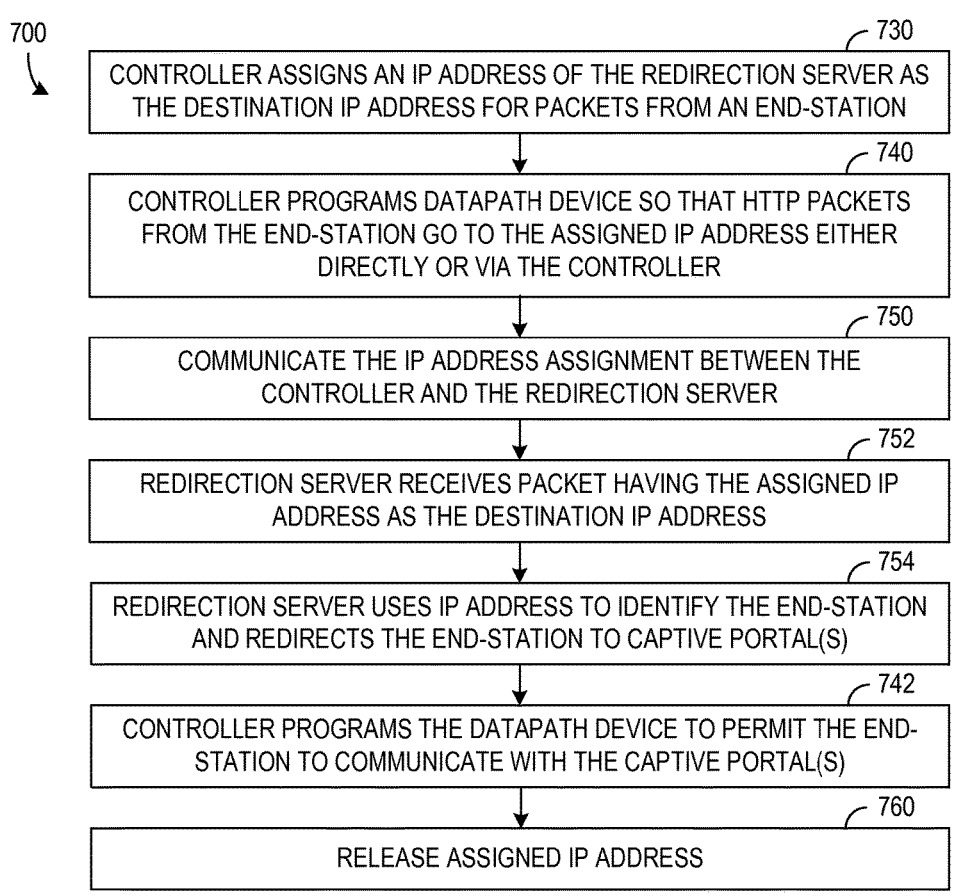
FIG. 7 is a flow diagram of a process that uniquely assigns one of multiple IP addresses of a server such as a captive portal server as the destination IP address of a connecting end-station so that the server can distinguish end-stations by the respective destination IP addresses that the end-stations use.

FIG. 7 is a flow diagram of a 700 process that allows a server to identify an end-station based on the destination IP address that the end-station uses. Process 700 may start as described above with a controller receiving (process block 610) an encapsulated packet from a connecting end-station and identifying (process block 620) the connecting station. Process block 730, which may correspond to one implementation of process block 630, represents the controller, e.g., OpenFlow controller 410, assigning one of the multiple IP addresses of the redirection server, e.g., redirection server 415, as a destination IP for packets from the connecting end-station. The controller executing process block 740 can then program the data-path device, e.g., OpenFlow device 450, so that packets from the connecting end-station are forwarded to the assigned one of the IP addresses of the redirection server. As described above, the data-path device or controller may alter the packets for forwarding to the redirection server. In process block 750, the controller and the redirection server communicate regarding the identity of the end-station assigned to the specific IP address of the redirection server. Such communication may be initiated by either the controller or the redirection server. For example, the controller can inform the redirection server of the assignment any time after the assignment is made, or the redirection server may contact the controller after receiving a packet at a particular one of the IP addresses of the redirection server. When the redirection server receives a packet having the assigned IP address as the destination IP address of the packet (as in process block 752), the redirection server can use the IP address and the information from the controller to identify the end-station (as in process block 754). The redirection server may inform the controller of the captive portal servers with which the connecting end-station is permitted to communicate, and in process block 742, the controller programs the data-path device to permit transmission of packets between the end-stations and the designated captive portal servers. After the redirection server has identified the end-station for captive portal process, the controller can release the assigned IP address of the redirection server, so that the controller can subsequently assign that IP address to another end-station seeking connection.

The approach of using a unique destination IP address for the short exchange between the end-station 465 and redirection server 415 works because the NAT router 440 does not modify the destination IP address in a packet. The challenge with this approach is allocating multiple public IP addresses for the redirection server 415. In practice, public IP addresses may not be free and abundant, but a small pool of addresses is manageable. The more unique destination IP addresses that can be used, the more concurrent sessions can be supported.

Destination Port Number Assignment

By default, the HTTP protocol normally runs over TCP port "80." When an end-station 465 makes its initial HTTP request, rule 4 in Table 1 above causes device 450 to intercept the packet and send the packet to controller 410 because the packet matches TCP port "80." The redirection server 415, however, can listen to any number of TCP ports to establish connections. (In theory, the TCP port number is a 16-bit field, and any value might be used to identify an end-station. Some TCP port numbers, however, are 'well known' port numbers or assigned for specific uses and may be avoided, so a pool of port numbers used for identifying end-stations may be limited to only including numbers that have not be assigned for other specific uses.) With a destination port assignment strategy, the OpenFlow controller 410 can cause the destination IP address of a packet from a connecting end-station 465 to be changed to the IP address of redirection server 415 and change TCP port "80" of the packet to a unique number that identifies the privately addressed end-station 465.

In a similar fashion to the unique destination IP address method above, the OpenFlow controller 410 can manage a pool of TCP port numbers that can be assigned to end-stations 465 during multiple simultaneous redirection processes. This strategy differs from destination IP address assignment primarily in that a single destination IP address may be used for the redirection server 415 and the TCP port numbers are modified on all packets exchanged between the end-station 465 and redirection server 415. Modifying the TCP port numbers is more involved than changing fields in the IP header, but many OpenFlow devices 450 support the set-field action for TCP and UDP port numbers. If the OpenFlow device 450 supports the set-field action, controller 410 may install the rules from Table 5 in the OpenFlow device 450 after controller 410 receives the initial encapsulated HTTP packet.

TABLE 5

| Priority | Rule |
|---|---|
| 3.1 | Match=<Source MAC>,<Source IP>, <Web Dest IP>,HTTP Dest Port; Action=Set-Field(NAT Dest MAC), Set-Field(Redir Dest IP), Set-Field(Dest Port),Forward Normal |
| 3.2 | Match=<Dest MAC>,<Dest IP>,<Redir Source IP>,<Source Port>; Action=Set-Field(Web Source IP), Set-Field(HTTP Source Port),Forward Normal |

If the OpenFlow device 450 does not support the appropriate set-field actions, each packet from the connecting end-station 465 may be sent to the controller 410 for modification of the packet to use the assigned TCP port, and OpenFlow controller 410 may program OpenFlow device 450 with the rules shown in Table 6, which are similar to those shown in Table 3. In particular, rule 3.1 of Table 6 is the same as in Table 3.1 and works for setting of the TCP port sent out through the NAT router, but the match portion of rule 3.2 of Table 6 is modified to have the same 'match' portion of the rules as in Table 5. With the rules of Table 6, packets are forwarded to the OpenFlow controller for modification and then returned to the OpenFlow device, rather than being modified by the OpenFlow device and forwarded normal with the rules of Table 5.

TABLE 6

| Priority | Rule |
|---|---|
| 3.1 | Outgoing packet Match=<Source MAC>, <Source IP>,<Web Dest IP>,HTTP Dest Port; Action=Forward to Controller |

TABLE 6-continued

| Priority | Rule |
| --- | --- |
| 3.2 | Incoming Packet Match=<Dest MAC>, <Dest IP>,<Redir Source IP>,<Source Port>; Action=Forward to Controller |

The redirection server 415 receives an HTTP request from the end-station 465, but on a unique port number on which the redirection server is listening. As with IP address assignment, the redirection server 415 and OpenFlow controller 410 must communicate with one another to exchange information about the identity of the connecting end-station 465, e.g., communicate a map between the TCP port and the identifying information for the end-station 465 and communicate an association of the end-station 465 with one or more captive portal web servers 420. Once redirected, the process of completing authentication is the same as the previous strategy.

Figure 8:
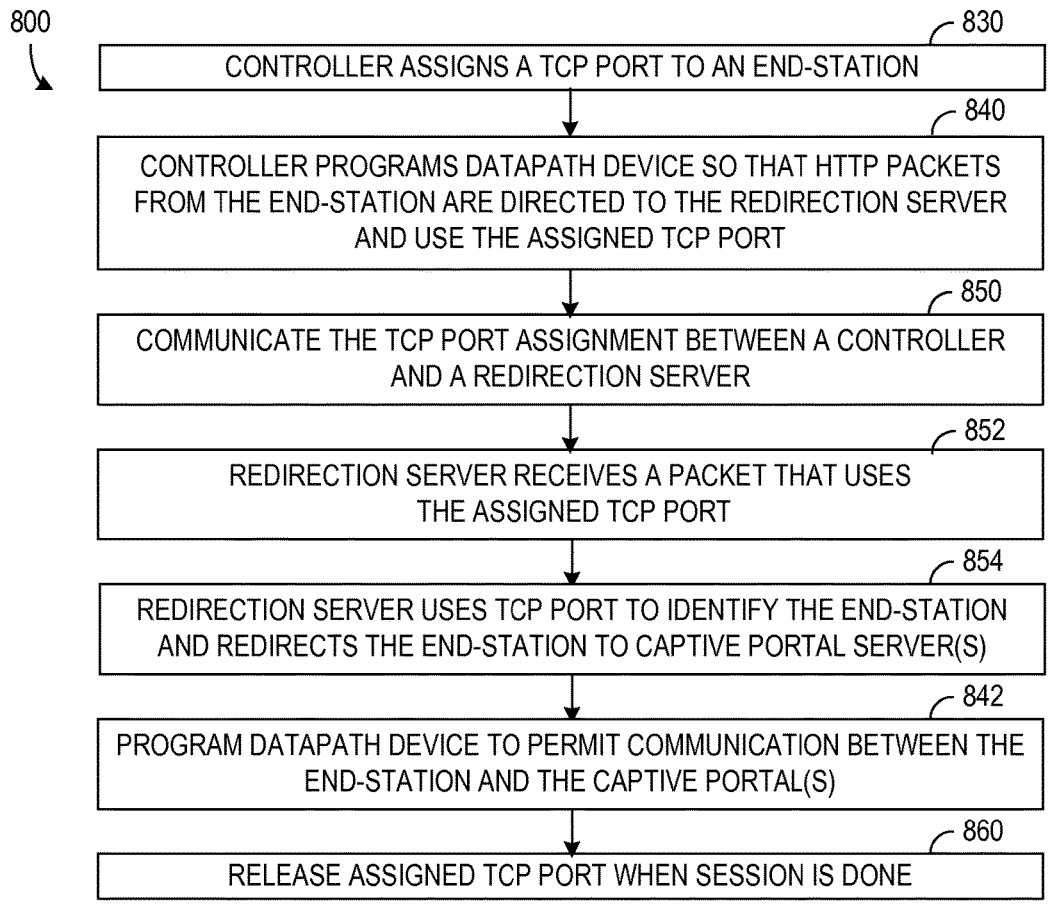
FIG. 8 is a flow diagram of a process that assigns a TCP port to a connecting end-station so that communications from end-stations can be distinguished by the respective TCP ports used.

FIG. 8 is a flow diagram of a process 800 that allows a server to identify an end-station based on the TCP port that the end-station uses. Process 800 may start as described above with a controller receiving (process block 610) an encapsulated packet from a connecting end-station and identifying (process block 620) the connecting station. In process block 830, which may correspond to another implementation of process block 630, the controller assigns a TCP port for the connecting end-station. The controller executing process block 840 can then program the data-path device so that packets from the connecting end-station are forwarded to the redirection server and use assigned TCP port. As described above, the data-path device or controller may alter the packets to change the destination IP address and for use of the assigned TCP port. In process block 850, the controller and the redirection server communicate regarding the identity of the end-station assigned to the specific IP address of the redirection server. Such communication may be initiated by either the controller or the redirection server in the same manner described above for destination IP address assignment. When the redirection server receives a packet using the assigned TCP port (as in process block 852), the redirection server can use the TCP port and the information from the controller to identify the end-station (as in process block 854). The redirection server may inform the controller of the captive portal servers with which the connecting end-station is permitted to communicate, and in process block 842, the controller programs the data-path device to permit transmission of packets between the end-stations and the designated captive portal servers. After the redirection server has identified the end-station for captive portal process, the controller can release the TCP port, so that the controller can subsequently assign that TCP port to another end-station seeking connection.

The redirection server, e.g., redirection server 415, can identify packets are from a specific end-station on a private network even after the packets have traversed a NAT router because NAT does not alter the TCP port being used.

IP-Options Value Assignment

Another strategy for identification of end-stations on a private network uses the values in the IP options field in packets from the end stations. FIG. 2 shows the IPv4 header including the IP options field. IP options are additional information carried in the IP header and have been used for control, debugging or measurements. A set of these options have been reserved for experimental purposes as described by IETF RFC 4727. This strategy for identifying an end-station on a private network uses the IP header option field, e.g., experimental IP option "94," to carry an identifier of a privately addressed end-station, so that the end-station can be identified on the public side of a NAT router.

As with IP destination assignment and TCP port assignment strategies described above, the OpenFlow controller 410 receives the initial HTTP request from an end-station 465 and takes necessary actions to have the packet modified in such a way that the redirect server 415 receives the HTTP request and can uniquely identify the end-station 465. With this strategy for captive portal applications, the OpenFlow controller 410 causes the destination IP address to be replaced and causes an identifier to be inserted in an IP option field of the IP header. For captive portal applications, the destination IP address is replaced with the IP address of redirection server 415. The IP option field that is inserted includes a unique end-station identifier. Such an identifier can take on many forms, but must fit within the constraints of an IP option field (i.e., a maximum of 254 octets). One example identifier could include the end-station's current private address combined with a network or NAT public address identifier.

New versions of the OpenFlow specification define an extensible set-field action that could allow IP options to be inserted into the packet automatically by OpenFlow device 450. If the OpenFlow device 450 supports this type of set-field action, OpenFlow controller 410 can program OpenFlow device 450 with the rules from Table 7 to enable the redirection.

TABLE 7

| Priority | Rule |
| --- | --- |
| 3.1 | Match=<Source MAC>,<Source IP>, <Web Dest IP>,HTTP Dest Port; Action=Set-Field(NAT Dest MAC), Set-Field(Redir Dest IP), Set-Field(Insert IP Option),Forward Normal |
| 3.2 | Match=<Dest MAC>,<Dest IP>,<Redir Source IP>,HTTP Source Port; Action=Set-Field(Web Source IP), Forward Normal |

If the OpenFlow device 450 is not capable of adding or removing an IP option using extensible set-field actions then the OpenFlow controller 410 can perform this function. The same rules used previously in Table 3 that allow the OpenFlow controller 410 to interject itself in all HTTP exchanges between the end-station and the redirection server 415 can be used.

Figure 9:
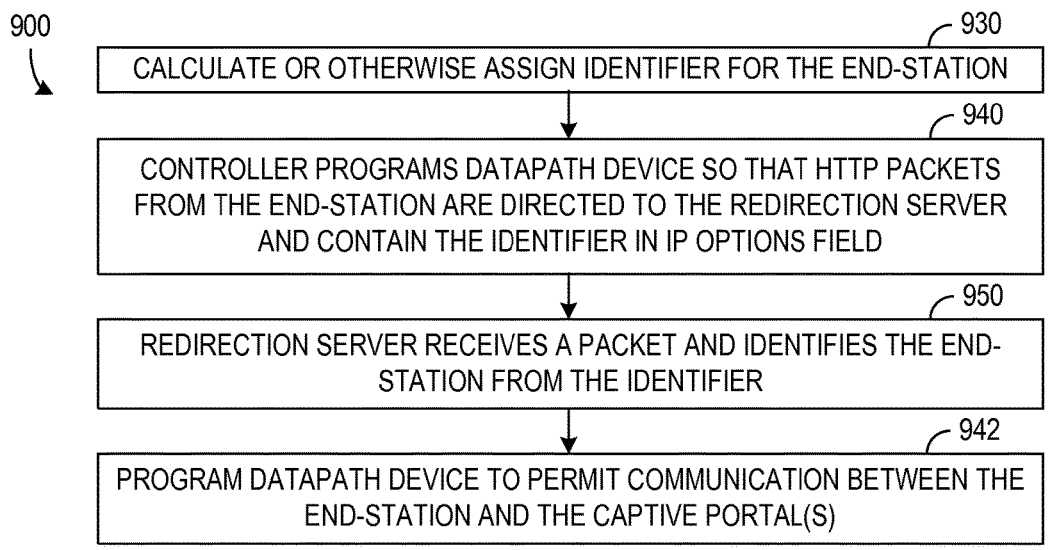
FIG. 9 is a flow diagram of a process that identifies or distinguishes end-stations using identifiers added to the Options fields in IP headers of packets from the end-stations.

FIG. 9 is a flow diagram of a 900 process that allows a server on one side of a NAT router to identify an end-station on the other side of the NAT router based on an identifier stored in the Options field in an IP header of a packet from the end-station. Process 900 may start as described above with (process block 610) a controller receiving an encapsulated packet from a connecting end-station and (process block 620) the controller identifying the connecting station. Process block 930, which may correspond to one implementation of process block 630 of FIG. 6, represents the controller, e.g., OpenFlow controller 410, calculating or otherwise determining an identifier for the end-station. For example, the controller can construct an identifier by combining or concatenating the end-station's current private address and a network or NAT public address of the private network or NAT router. The controller executing process block 940 can then program the data-path device, e.g., OpenFlow device 450, so that packets from the connecting end-station are forwarded to the redirection server. At least an initial packet to the redirection server contains the identifier in the IP options field of the IP header. As described above, the data-path device or controller may alter the packets, e.g., insert identifiers in the Options fields of IP headers, for forwarding to the redirection server. In one implementation, the identifiers for end stations are determined according to a rule that is understood by both the controller and the redirection server, so that communication of identifying information between the controller and the redirection server is not required for each end-station. Alternatively, the identifier may have any value that the controller assigns, and the controller may communicate to the redirection server a mapping of the identifier and the identity of the end-station. In both cases, for captive portal applications, the redirection server may still need to inform the controller of IP addresses of the captive portal servers, e.g., servers 420, that the end-station needs to communicate with for authentication. When the redirection server receives a packet as in process block 950, the redirection server can extract the identifier from IP Options field of the IP header and uniquely identify the end-station using the identifier and a calculation or protocol that the controller and the redirection server have agreed applies. An advantage of this strategy is that the number of simultaneous connection processes are not limited by a small number of available resources. Existing NAT routers, however, do not treat the IP Options consistently. Some NAT routers strip out or change the IP Options, in which case one of the other end-station identification processes disclosed herein may be used.

Calculation Based on Payload

If the contents of the TCP payloads in packets generated by the end-stations 465 are themselves unique, then performing a cryptographic hash of those contents may provide identifiers of the privately addressed end-stations 465. Since the TCP payload portion of a packet is not modified by the NAT router 440, the TCP payload portion will have the same hash value both before and after traversing the NAT router 440. The OpenFlow controller 410 has the ability to inject itself into the set of exchanges between a connecting end-station and the redirection server 415 before those exchanges traverse the NAT router 440, and as a consequence, OpenFlow controller 410 can calculate a hash value on the specific contents from each packet, e.g., of TCP payloads. OpenFlow Controller 410 can record an association of the hash values with the identities of the end-stations, e.g., in database 412. The redirection server 415 upon receiving a packet can also calculate a hash value on the same received contents of the packet after the packet has traversed the NAT router and by communicating with the OpenFlow controller 410, can associate the received packet with a particular end-station 465 in the privately addressed space.

With this strategy, OpenFlow controller 410 may modify the IP addresses of HTTP packets between the end-station 465 and the redirection server 415, but since OpenFlow controller 410 must also receive every packet in order to calculate the hash values, OpenFlow controller 410 does not need to take advantage of any extra set-field actions that may be available on the OpenFlow device 450. The rules used for OpenFlow devices 450 that do not support the set-field action (e.g., the rules of Table 3) can be used, and the OpenFlow controller 410 itself may calculate the hash on the TCP payload using a cryptographic method such as MD5, SHA-128, or similar hash algorithms or processes. The hash values can be stored on the OpenFlow controller 410 in a local database 412 that associates the hash values with the identities of particular privately addressed end-stations.

When the redirection server 415 receives an HTTP packet, redirection server 415 may calculate the hash using the same cryptographic method that OpenFlow Controller 410 used and communicates with the OpenFlow controller 410 to receive from OpenFlow controller 410 information identifying the end-station 465 corresponding to the hash value just calculated. Controller 410 only needs to maintain the hash values, which may be stored in the local database 412, for the duration of the HTTP redirection exchange. Upon successful redirection, the OpenFlow rules that allow communications with the captive portal server 420 can be programmed and the database entries can be removed.

Calculation Based on Modified Payload

It is difficult to know if a payload in an HTTP exchange with the redirection server 415 will be unique or will provide a unique hash value. However, a portion of the contents in the HTTP request from the end-station is ignored and may be modified to guarantee uniqueness. For example, the User-Agent HTTP field is non-essential for a redirection. In this embodiment, the OpenFlow controller 410 changes the values of non-essential HTTP fields in the TCP payload without changing the payload length. Keeping the payload length the same gracefully allows the TCP connection to be established and persist between the redirection server 415 and the end-station 465. The TCP connection is reliable and provides facilities to assure that information is not lost or inserted into the packet. To maintain the connection, the payload length must remain the same, but the contents can be modified, provided that the OpenFlow controller 410 also properly recalculates and modifies the TCP checksum.

Similar to the strategy where contents are hashed but not modified, the OpenFlow controller 410 may inject itself in the exchanges between the end-station 465 and the redirection server 415, modifying the IP addresses to enable the connection, but may also modify the HTTP request data, e.g., with unique random values in non-essential fields such as the User-Agent field and correcting the TCP checksum, before calculating the cryptographic hash over the entire payload. As with the methods disclosed above, OpenFlow controller 410 may return the modified packet to the OpenFlow device 450 in an OpenFlow Packet-Out message so the packet may be forwarded to the redirection server 415 via the NAT router 440. When redirection server 415 receives the HTTP request it will perform the same steps as in the previous strategy. It will perform the cryptographic hash and will communicate with the OpenFlow controller 410 to determine the identity of the privately addressed end-station 465.

The OpenFlow rules programmed in the OpenFlow device to enable this method are identical to the previous strategy. See, for example, Table 3 above.

Figure 10:
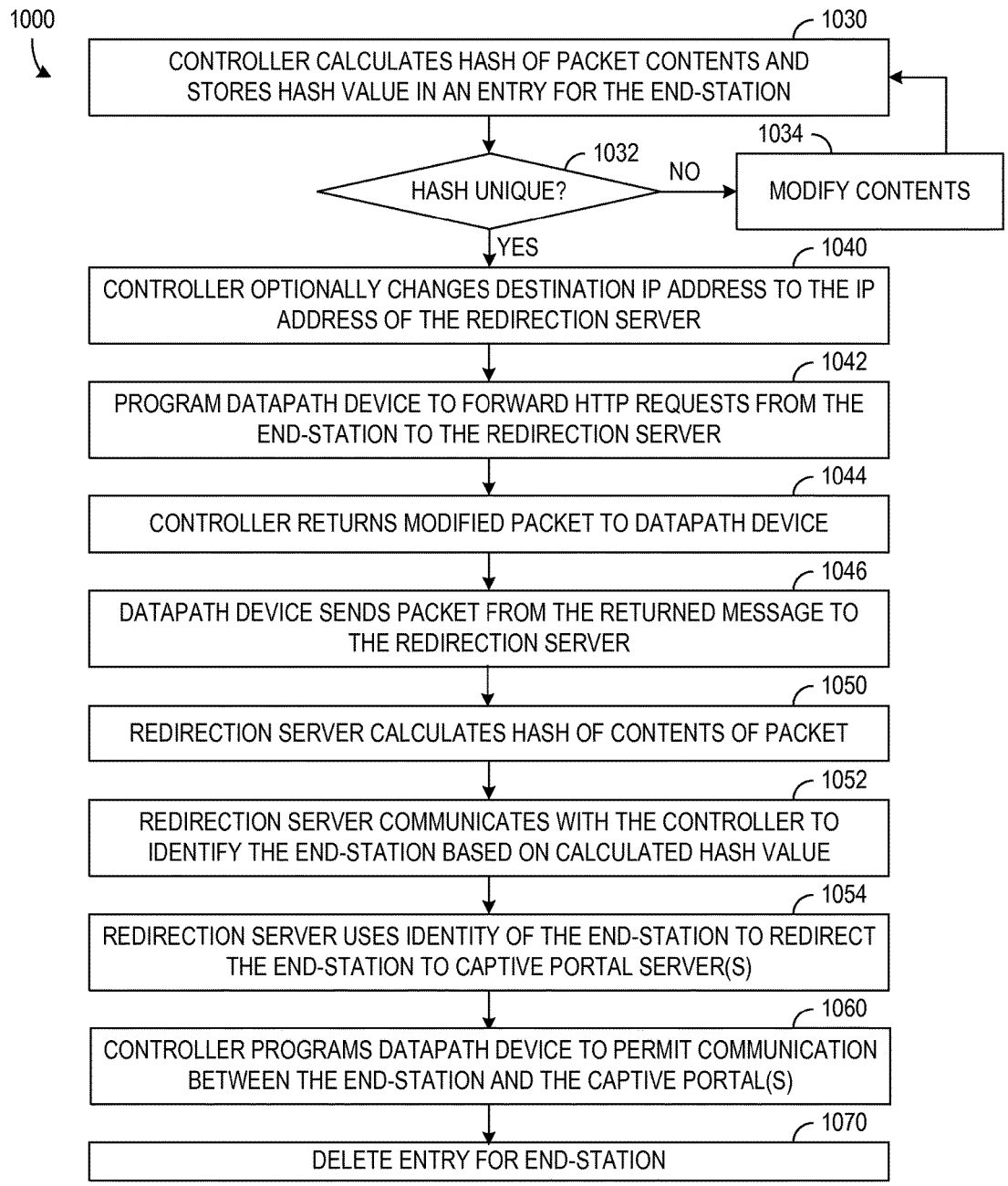
FIG. 10 is a flow diagram of a process that uses a hash of packet contents that are not changed by a NAT router to identify an end-station that sent the packet.

FIG. 10 is a flow diagram of a process 1000 that distinguishes HTTP packets from end-stations based on hash values of packet contents that may or may not be altered by the controller. Processes such as process block 610 in which a controller receives an encapsulated packet from a connecting end-station and process block 620 in which the controller identifies the connecting station may precede the process flow illustrated in FIG. 10. A process block 1030, which may correspond to a portion of one implementation of process block 630 of FIG. 6, represents the controller, e.g., OpenFlow controller 410, calculating or otherwise determining a hash value from the contents of an encapsulated packet. In a decision block 1032, the controller determines whether the hash value is unique relative to any currently active hash values. If the hash value is not unique, the controller in process block 1034 modifies the contents, e.g., by inserting a random value in a non-essential field of the content, and then calculates the hash value for the modified contents, e.g., by repeating process block 1030. If the controller determines in decision block 1032 that the hash value is unique, the controller can: change the destination IP address in the packet (process block 1040); cause the data-path device, e.g., OpenFlow device 450, to forward packets from the end-station to the redirection server (process block 1042), and return the packet to the data-path device (process block 1044). The data-path device in process block 1046 thus sends the packet, which may have the original content or modified content, to the redirection server, e.g., redirection server 415. The redirection server in process block 1050 calculates the hash of the content of the packet as received at the redirection server. The redirection server and the controller agree to use the same hashing process so that the hash value that the redirection server calculated for a packet should be the same as the hash value that the controller calculated for the packet. The redirection server in process block 1052 communicates with the controller to receive identifying information for the end-station that created the packet having the calculated hash value. With the end-station identified, the redirection server in process block 1054 can redirect the end-station to the appropriate captive portal servers and inform the controller of the IP addresses of those captive portal servers. The controller in process block 1060 can then program the data-path device so that the end-station can communicate with the designated captive portal servers. The controller in process block 1070 can then delete the entry, e.g., the hash value and identifying information, for the connecting end-station.

Application Server and Openflow Controller API

OpenFlow controller 410 may need to support some form of application programming interface (API) for application servers that need to identify privately-addressed end-stations. With each of the strategies described above, the OpenFlow controller 410 maintains a local database 412 of information that binds the identities of end-stations with strategy-specific information needed to resolve the end-stations' identities. In the case of the captive portal example, the application server is the redirection server 415. Redirection server 415 establishes an initial TCP connection and receives an HTTP request from the end-station 465. Depending upon the method, the redirection server 415 will have some piece of information that redirection server 415 can use to query the OpenFlow controller 410 to obtain parameters of the end-station 465 that may be placed in the URL of the HTTP redirect to the captive portal server 420. For the above-described processes, the information for the query by method may include:

A Destination Address Assignment;
A Destination TCP Port Number Assignment;
An IP Option Value Assignment; or
A Calculation Based on Payload (or Modified Payload)

The OpenFlow controller 410 may search the local database 412 using the information from the redirection server 415 and obtain identity information about the privately addressed end-station 465 to be used as parameters in the redirection URL that the redirection server 415 creates. The parameters needed for the URL depend upon the captive portal web-server's needs and the process for authenticating the end-user and are beyond the needs of this description. Example parameters include: identity of the OpenFlow device 450 to which the connecting end-station 465 is attached, the port on which the connecting end-station 465 attached to the OpenFlow device 450, an identity of the end-station and/or session identity, a MAC address and an IP address of end-station, or a type of access control method supported by the Captive Portal to name some examples. Such information may be stored, for example, in entries End-Station 1 to End-Station N in database 412 of FIG. 4B.

CONCLUSION

Some implementations described above identify a privately addressed end-station from the public side of a NAT router. OpenFlow facilities may be used to calculate values and make modifications to packets on the private side of a network that allow information to pass transparently through a NAT router such that an application on the public side of the network can determine the end-station's identity. An application may communicate with the OpenFlow controller on the public side of the NAT router to resolve the identity of an end-station transmitting a packet through the NAT router.

Some embodiments of the above invention can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A process comprising:
   receiving, at a controller on a first network, a message from a data-path device on a second network, wherein the message contains a packet that was encapsulated into the message, the packet being from an end-station on the second network and being encapsulated before the packet passes through a network address translation (NAT) device between the second network and the first network;
   from the message at the controller, determining identifying information that identifies the end-station;
   the controller modifying content of the packet to create a modified packet;
   the controller mapping the identifying information to a packet characteristic, wherein the packet characteristic is a hash value calculated from contents of the modified packet;
   conveying to a server seeking to distinguish end-stations that the packet characteristic maps to the end-station;
   the controller sending to the data-path device, a second message in which the modified packet is encapsulated; and
   the data-path device forwarding the modified packet.

2. The process of claim 1, wherein the controller modifies the content of the packet so that the hash value of the modified packet uniquely identifies the modified packet as corresponding to the end station.

3. A process comprising:
   receiving, at a controller on a first network, a message from a data-path device on a second network, wherein the message contains a packet that was encapsulated into the message, the packet being from an end-station on the second network and being encapsulated before the packet passes through a network address translation (NAT) device between the second network and the first network;

from the message at the controller, identifying the end-station;

the controller assigning to the end-station a destination IP address selected from among a plurality of IP addresses of a server outside of the second network, the destination IP address being at least temporarily associated uniquely with the end-station;

conveying to the server that the communication parameter is assigned to the end-station; and programming the data-path device to modify packets from the end-station so that the packets, when directed through the NAT device, use the destination IP address assigned to the end-station, wherein the server identifies packets as being from the end-station based on receiving the packets at the destination IP address associated with the end-station.

4. The process of claim 3, wherein the second network is a private network.

5. The process of claim 3, wherein the data-path device is an OpenFlow device, and the controller is an OpenFlow controller.

6. The process of claim 3, wherein the server is on the second network.

7. A process comprising:

receiving, at a controller on a first network, a message from a data-path device on a second network, wherein the message contains a packet that was encapsulated into the message, the packet being from an end-station on the second network and being encapsulated before the packet passes through a network address translation (NAT) device between the second network and the first network;

from the message at the controller, identifying the end-station;

the controller assigning to the end-station a communication parameter selected from among a plurality of available communication parameters;

conveying to a server outside of the second network that the communication parameter is assigned to the end-station, wherein the server is a redirection server;

programming the data-path device to modify packets from the end-station so that the packets, when directed through the NAT device, use the communication parameter assigned to the end-station;

the server receiving a received packet via the NAT device; and the server identifying the end-station as source of the received packet based on the communication parameter being used in the received packet.

8. The process of claim 7, wherein the communication parameter is a destination IP address that is at least temporarily associated uniquely with the end-station.

9. The process of claim 7, wherein the communication parameter is a source port number that is at least temporarily uniquely associated with the end-station.

10. The process of claim 7, wherein the communication parameter is a value of an IP options field that is at least temporarily uniquely associated with the end-station.

11. The process of claim 7, further comprising:

the server receiving a received packet via the NAT device; and the server identifying the end-station as source of the received packet based on the communication parameter being used in the received packet.

12. The process of claim 7, further comprising:

the controller receiving address information of a captive portal server; and programming the data-path device to permit the end-station to communicate with the captive portal server.

13. The process of claim 7, further comprising releasing assignment of the communication parameter to the end-station to thereby permit the communication parameter to be uniquely assigned to another end-station on the second network.

* * * * *